(No Model.)

D. A. FERRIER.
PUMP REGULATOR FOR WINDMILLS.

No. 459,275. Patented Sept. 8, 1891.

WITNESSES:
Chas. Nida
C. Sedgwick

INVENTOR:
D. A. Ferrier
BY Munn & Co.
ATTORNEYS

UNITED STATES PATENT OFFICE.

DANIEL A. FERRIER, OF CRETE, NEBRASKA.

PUMP-REGULATOR FOR WINDMILLS.

SPECIFICATION forming part of Letters Patent No. 459,275, dated September 8, 1891.

Application filed March 3, 1891. Serial No. 383,579. (No model.)

*To all whom it may concern:*

Be it known that I, DANIEL A. FERRIER, of Crete, in the county of Saline and State of Nebraska, have invented a new and Improved Pump-Regulator for Windmills, of which the following is a full, clear, and exact description.

My invention relates to an improved pump-regulator for windmills, and has for its object to provide a device which will automatically throw the mill in the wind when the water in the cistern is low, and which will also automatically throw the mill out of the wind when the cistern has received its proper supply.

A further object of the invention is to so construct the device that should the mill be thrown in the wind by a high wind or other unforeseen factor the pull rope, wire, or chain controlling the windmill will not be subjected to undue strain, and whereby also the mill may be thrown in the wind whenever desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
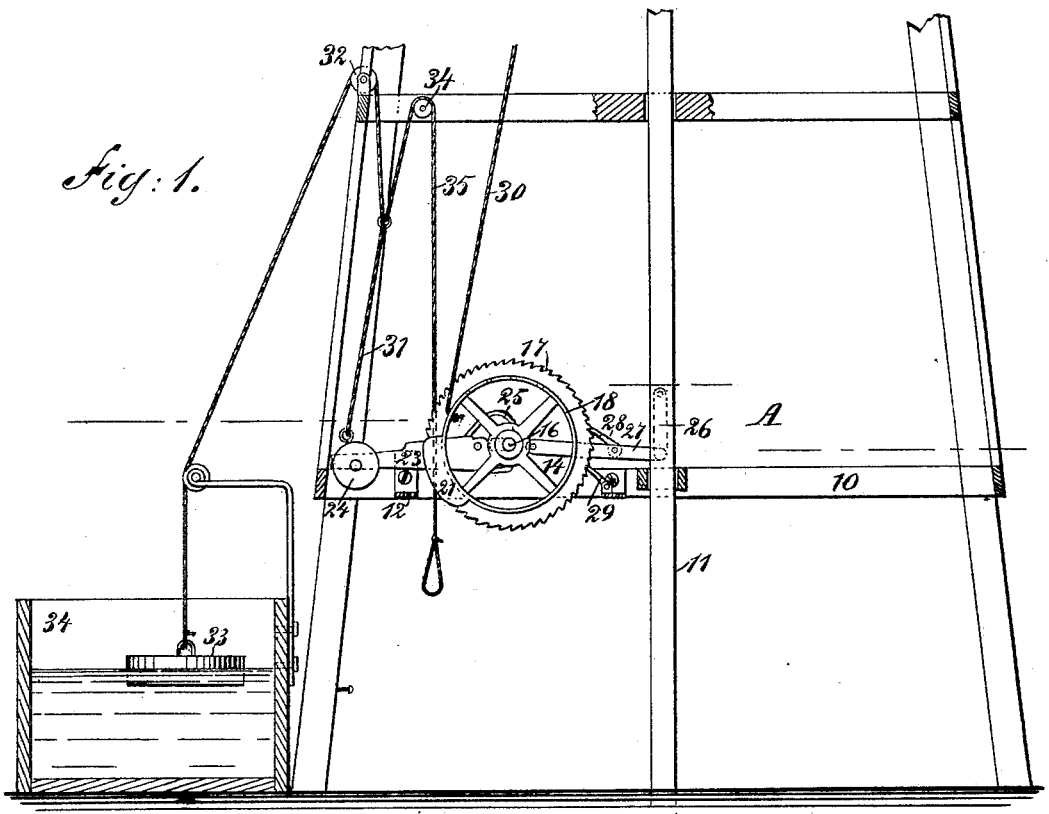
Figure 2:
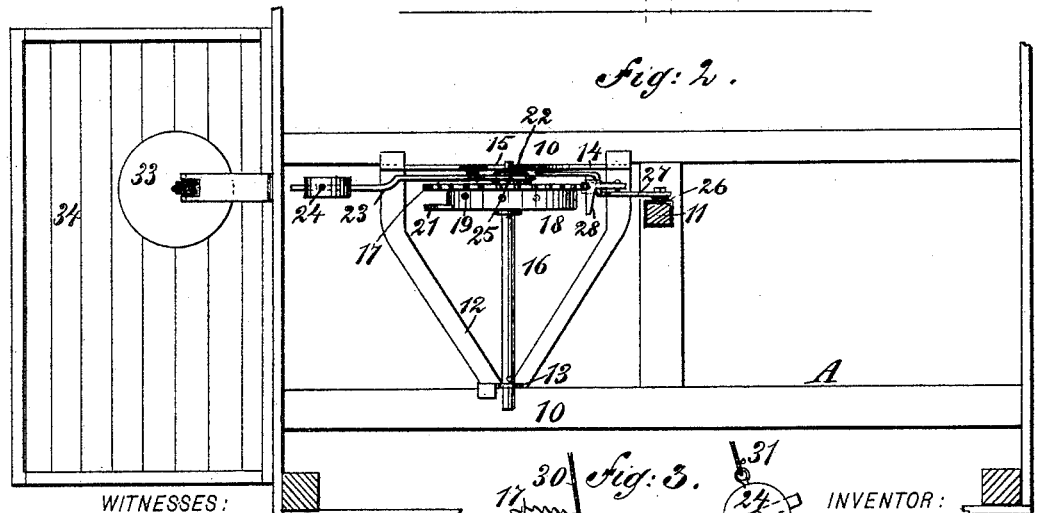
Figure 3:
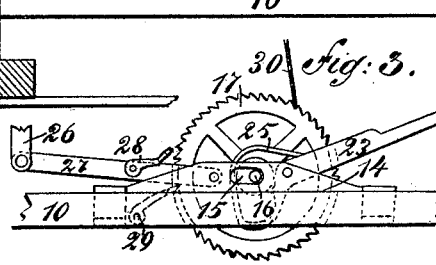

Figure 1 is a side elevation of the device, the tank being in section, and a portion of the tower being also shown in section. Fig. 2 is a plan view of the device; and Fig. 3 is a side elevation, the side taken being that opposite to the side illustrated in Fig. 1 and the trip-lever being shown in position to set the device in operation.

Upon suitable beams 10 of the tower A, in front of the pump-rod 11, a frame 12 is horizontally attached, which frame is preferably made somewhat V-shaped in general contour. A bearing 13 is located at the contracted end of the frame, and the members at the wider end are connected by a bar 14, in which an oblong bearing 15 is produced. A shaft 16 is journaled at its extremities in the bearings 13 and 15, and upon the shaft, between suitable collars, a ratchet-wheel 17 is loosely mounted, provided upon its inner face with a drum-section 18, the said drum being provided with apertures 19, arranged at suitable distances apart, and at one point upon the periphery of the drum a cam-flange 21 is formed. A roller 22 is loosely mounted upon the shaft 16 between its bearing 15 and the ratchet-wheel 17, and in connection with the shaft a trip-lever 23 is employed, the outer end whereof is provided with an attached weight 24 and the inner end with a cam-loop 25, the said loop being adapted to receive and engage with the roller 22 upon the shaft. When the trip-lever is in a horizontal position, the lower face of the loop, through the medium of the roller 22, forces the shaft 16 to remain at one end of the elongated bearing 15; but when the weighted end of the lever 24 is elevated the upper portion of the cam-loop engages with the roller and draws the roller in the direction of the weight, consequently moving the shaft to the opposite end of its bearing 15. When the shaft is in the latter position, the device is out of gear with the pump and the wind-wheel is thrown in the wind. When the lever is in the first-named position—that is, horizontal—the wheel is thrown out of the wind and the device is in gear with the pump. The lever is preferably fulcrumed upon the bar 14 of the frame 12. A link 26 is pivotally attached to one side of the pump-rod 11, and the lower end of the link is pivotally attached to one extremity of a driving-lever 27, the opposite extremity of said lever being pivoted to the frame-bar 14. The driving-lever is provided with a pivoted dog 28, so located that it will engage with the ratchet-wheel 17, and a pawl 29 is pivoted upon the frame, also adapted to engage with the the ratchet-wheel, the said pawl being so constructed that it never drops downward out of engagement with the wheel.

The pull rope, chain, or wire 30, connected with the wind-wheel and whereby the mill is thrown in and out of the wind, is attached to the drum-section of the ratchet-wheel, and a cable or chain 31 is attached at one end to the weight 24 of the trip-lever, which cable or chain is passed upward over a friction-pulley 32, located in the tower, and downward to an attachment with a float 33, located in the cistern or tank 34. A cable or chain 35 is attached to the cable or chain 31 within the tower, and the said chain or cable 35 is passed downward over a friction-pulley 36 to within convenient reach of the ground, whereby the device may be manipulated by hand, when desired, although ordinarily the device is automatic in its operation.

The manner in which the pull rope, chain, or wire 30 is attached to the drum is as follows: The ratchet-wheel is turned until the cam-flange 21 of the drum engages with the dog 28 and lifts the said dog out of engagement with the teeth of the ratchet-wheel, the teeth being held only by the pawl 29. The wire, rope, or chain 30 is then drawn downward around the drum-section of the ratchet-wheel until the wind-wheel is thrown out of the wind, and when the length of wire, rope, or chain necessary to accomplish this result has been ascertained the said rope or chain is secured to the drum by passing it through one of the nearest apertures 19, and before securing it the operator must accurately note that the drum-flange is in engagement with the dog and the wind-wheel is out of the wind.

In operation, when the tank is empty, or comparatively so, the float 33 will have descended such a distance in the tank as to elevate the weighted end of the trip-lever essentially to the position illustrated in Fig. 3, and by so doing the cam-loop of the lever shifts the position of the shaft 16 sufficiently to disengage the ratchet-wheel from the dog 28 and the pawl 29. The wheel will now turn by reason of the pressure brought to bear upon it by the wind upon the wind-wheel, and as the pull wire or cable 30 is slack at this time the wind-wheel is brought into the wind and the pump-rod is set in operation. When a sufficient amount of water has been delivered to the tank to carry the float upward and permit the trip-lever to assume its normal or horizontal position, as the lever drops the shaft is again shifted and the ratchet-wheel is brought into engagement with the dog and the pawl. The pump-rod still moves, and in moving the dog 28 forces the ratchet-wheel to revolve and the pull wire or cable is wound upon the drum sufficiently to carry the wheel out of the wind, and consequently stop the movement of the pump-rod. In the event that a high wind should arise or that any other unforeseen factor should throw the mill-wheel into the wind the pump-rod operating will turn the mill-wheel only until the cam-flange of the drum disengages the dog from the wheel, the wheel at this time being held by the pawl 29 only. Thus undue tension will not be brought to bear upon the pull rope or chain. When it is desired to throw the mill-wheel into the wind, even when the cistern is full, it may be accomplished by drawing downward upon the rope or cable 35.

Having thus described my invention, I claim as new and desire to secure by Letters Patent—

1. In a pump-regulator for windmills, the combination, with a shaft capable of lateral movement at one end and a shifting-lever provided with a cam-loop at one extremity controlling the lateral movement of the shaft and having connection at one end with a float, of a ratchet-wheel loosely mounted upon the shaft, provided with a drum-section at one face, which drum-section is adapted for attachment to a pull rope or wire of a windmill and is provided with a peripheral cam-surface, a pump-rod, and a dog having a pivotal connection with the pump-rod and adapted for engagement with the teeth of the ratchet-wheel, as and for the purpose specified.

2. In a pump-regulator for windmills, the combination, with a frame, a shaft mounted therein capable of a lateral movement at one end, and a trip-lever having connection with a float at one end and provided with a cam-loop at its opposite end adapted to control the lateral movement of the shaft, of a ratchet-wheel loosely mounted upon the shaft, a drum connected with the ratchet-wheel and adapted for attachment to the pull rope or wire of the mill-wheel, a cam-flange attached to the drum, a lever adapted for attachment to the pump-rod, a dog pivoted upon the lever and engaging the teeth of the ratchet-wheel, and a pawl pivoted to the frame and also engaging the teeth of the ratchet-wheel, as and for the purpose set forth.

3. In a pump-regulator for windmills, the combination, with a frame, a shaft journaled in the frame and having lateral movement at one end, a pump-rod, a tank, a float located in the tank, a trip-lever weighted at one end and provided with a cam-loop at its opposite end controlling the lateral movement of the shaft, and a connection between the float and the weighted end of the trip-lever, of a ratchet-wheel loosely mounted upon the shaft, a friction-wheel also loosely mounted upon the shaft and encircled by the cam-loop of the trip-lever, a drum secured to one face of the ratchet-wheel and adapted for attachment to the pull rope or wire of the wind-wheel, a cam projection formed upon the drum, a lever connected to the pump-rod, a dog pivoted to the lever and engaging with the teeth of the ratchet-wheel, and a pawl pivoted to the frame and also engaging with the ratchet-wheel, as and for the purpose specified.

DANIEL A. FERRIER.

Witnesses:
T. W. CARDINELL,
JOHN BRYSON.